(12) United States Patent
Ma et al.

(10) Patent No.: US 11,914,376 B2
(45) Date of Patent: Feb. 27, 2024

(54) USV FORMATION PATH-FOLLOWING METHOD BASED ON DEEP REINFORCEMENT LEARNING

(71) Applicant: WUHAN UNIVERSITY OF TECHNOLOGY, Hubei (CN)

(72) Inventors: Yong Ma, Hubei (CN); Yujiao Zhao, Hubei (CN); Hao Li, Hubei (CN)

(73) Assignee: WUHAN UNIVERSITY OF TECHNOLOGY, Hubei (CN)

( * ) Notice: Subject to any disclaimer, the term of this patent is extended or adjusted under 35 U.S.C. 154(b) by 372 days.

(21) Appl. No.: 17/364,884

(22) Filed: Jul. 1, 2021

(65) Prior Publication Data
US 2022/0004191 A1    Jan. 6, 2022

(30) Foreign Application Priority Data
Jul. 1, 2020   (CN) .................... 202010626769.X

(51) Int. Cl.
G05D 1/02        (2020.01)
G05D 1/00        (2006.01)
G06N 3/045       (2023.01)
G06N 7/01        (2023.01)

(52) U.S. Cl.
CPC ......... G05D 1/0206 (2013.01); G05D 1/0088 (2013.01); G06N 3/045 (2023.01); G06N 7/01 (2023.01)

(58) Field of Classification Search
CPC .... G05D 1/0206; G05D 1/0088; G06N 3/045; G06N 7/01; G06N 3/08; B63B 2035/007
USPC .......................................................... 701/21
See application file for complete search history.

(56) References Cited

U.S. PATENT DOCUMENTS

| | | | |
|---|---|---|---|
| 2017/0166222 A1* | 6/2017 | James | G05D 1/0088 |
| 2021/0116922 A1* | 4/2021 | Ma | G06N 7/01 |
| 2022/0348220 A1* | 11/2022 | Narang | G06V 20/56 |
| 2022/0366527 A1* | 11/2022 | Appu | G06N 3/045 |

FOREIGN PATENT DOCUMENTS

| | | |
|---|---|---|
| CN | 108073175 A | 5/2018 |
| CN | 109765916 A | 5/2019 |
| CN | 109934332 A | 6/2019 |

* cited by examiner

*Primary Examiner* — Mahmoud S Ismail
(74) *Attorney, Agent, or Firm* — True Shepherd LLC; Andrew C. Cheng

(57) ABSTRACT

The invention discloses an unmanned surface vessel (USV) formation path-following method based on deep reinforcement learning, which includes USV navigation environment exploration, reward function design, formation pattern keeping, a random braking mechanism and path following, wherein the USV navigation environment exploration is realized adopting simultaneous exploration by multiple underactuated USVs to extract environmental information, the reward function design includes the design of a formation pattern composition and a path following error, the path following controls USVs to move along a preset path by a leader-follower formation control strategy, and path following of all USVs in a formation is realized by constantly updating positions of the USVs. The invention accelerates the training of a USV path point following model through a collaborative exploration strategy, and combines the collaborative exploration strategy with the leader-follower formation control strategy to form the USV formation path following algorithm.

6 Claims, 5 Drawing Sheets

USV FORMATION PATH-FOLLOWING METHOD BASED ON DEEP REINFORCEMENT LEARNING

CROSS-REFERENCE TO RELATED APPLICATION

This application claims the priority benefit of China application serial no. 202010626769.X, filed on Jul. 1, 2020. The entirety of the above-mentioned patent application is hereby incorporated by reference herein and made a part of this specification.

BACKGROUND

Technical Field

The present invention belongs to the field of USV formation path following control, and particularly relates to a USV formation path-following method based on deep reinforcement learning.

Description of Related Art

An unmanned surface vessel (USV) is characterized in high flexibility and high speed, and is often used to perform unmanned tasks, such as reconnaissance, meteorological monitoring, and environmental monitoring. In recent years, great progress is made in USV-related research and technologies. Meanwhile, subsequent multi-underactuated USV formation path following has gradually attracted wide attention. Multi-underactuated USV formation can play an important role in search and rescue, reconnaissance, data collection, marine decontamination and so on. Path following is one of the basic issues in USV control. The main purpose of USV formation path following is to allow multiple underactuated USVs to keep a certain formation pattern and sail along a preset path.

Meanwhile, the reinforcement learning technology has been widely studied and applied in the fields of artificial intelligence, machine learning and automatic control, and is considered as one of the core technologies in designing intelligent systems. With the technological breakthrough in the field of machine learning, a great number of studies on the combination of reinforcement learning and deep learning have been carried out. Therefore, how to realize USV formation path following based on deep reinforcement learning is a technical problem that needs to be solved urgently.

SUMMARY

In view of the above defects or improvement requirements of the prior art, the present invention provides a USV formation path-following method based on deep reinforcement learning to realize USV formation path following based on deep reinforcement learning.

In order to achieve the above object, according to one aspect of the present invention, a USV formation path-following method based on deep reinforcement learning is provided, which comprises:

step S1, constructing a decision-making neural network model;

step S2, according to simultaneous exploration of multiple underactuated USVs, extracting environmental information of water space and storing data to the experience pool;

step S3, selecting training data from the data stored in the experience pool to train the decision-making neural network model, and adopting a random braking mechanism to optimize a training process of deep reinforcement learning, so as to obtain USV formation pattern keeping capacity;

step S4, controlling the USVs to move along a preset path by the decision-making neural network model based on collaborative exploration, and continuously updating the positions of the USVs, thus realizing path following for all the USVs in a formation; and step S5, controlling the movement of the USV pattern according to path following, so as to keep the USV following pattern and realize formation path following.

Preferably, S2 comprises:

outputting actions through the decision-making neural network model, saving relevant states, actions and rewards in the experience pool, and then selecting the experience records from the experience pool to form a training data set, wherein when the training data set is used to train the decision-making neural network model, each USV starts detection from different initial states, and detected motion states are stored in the experience pool.

Preferably, in a reward function, while the speed of the USVs is considered, when sailing toward reference coordinate points, the speed of the USVs should be maximized, and the lateral deviation speed should be minimized, and a distance between the USVs and the reference coordinate point is regarded as a design factor of the reward function.

Preferably, the reward function is designed according to $R = k_v R_v + k_d R_d$ where $R_v$ represents the speed of the USVs, $R_d$ represents the distance between the USVs and the reference coordinate point, and $k_v$ and $k_d$ are the weights of the speed and the distance.

Preferably, step S3 comprises:

training the decision-making neural network model based on a deep deterministic policy gradient (DDPG) algorithm, and introducing an Ornstein-Uhlenbeck (OU) process into DDPG in the training process to explore the environment, wherein when the decision-making neural network model makes a decision and outputs an action $a_t = \mu(s_t)$ an action produced by a random process is $a_{no\text{-}brake} = \mu(s_t) + N$, an average value of noise N is 0, $a_t$ indicates the action output by a neural network, $\mu(s_t)$ indicates a neural network decision strategy, $s_t$ indicates a state input into the neural network at time T, and $a_{no\text{-}brake}$ indicates an action generated by adding random noise to the action output by the neural network.

Preferably, the decision-making neural network model keeps the USV formation pattern by learning shared decisions, designs an actor network as an approximate strategy, and updates parameters in the actor network by a gradient descent method.

Preferably, a target evaluation network in the decision-making neural network model is determined according to $Q(s,a) = \overline{\omega}_a^T C(s,a)$, the target evaluation network is updated as $L(\overline{\omega}) = E[(r(s,a) + \gamma Q(s',a'; \overline{\omega}_a) - Q(s,a; \overline{\omega}_\beta))^2]$ by optimizing a loss function, and a parameter $\overline{\omega}_\beta$ is updated by a random gradient descent method, where $\overline{\omega}_\beta$ is a parameter in an online evaluation network, $\overline{\omega}_a$ is a parameter in the target evaluation network, s indicates a next state after taking an action a at a state s, a' is an action taken by the decision-making neural network at s', r is a reward value, $L(\overline{\omega})$ represents a loss value between an output value of the trained network and an expected value, $\overline{\omega}$ represents a set of $\overline{\omega}_a$ and $\overline{\omega}_\beta$, r(s,a) represents a reward value, γ represents a discount factor, $Q(s',a'; \overline{\omega}_a)$ represents a target evaluation value of the target evaluation network, $Q(s,a,\bar{\omega}_\beta)$ represents a target evaluation value of the online evaluation network, $C(s,a)$ represents a combination of s and a, s represents a state vector, and a represents an action vector.

Preferably, S4 comprises:

assuming that a center point of the USV formation is $p_c(x_c,y_c)$, where $x_c,y_c$ respectively represent the abscissa and ordinate of the center point of the USV formation, $e_d$ represents a cross track error between $p_c$ and a point $p_p(x_p,y_p)$ on the preset path, $x_p,y_p$ represent the abscissa and ordinate of $p_p(x_p,y_p)$, $p_v(x_v,y_v)$ represents an expected position of a virtual guide, $x_v,y_v$ represent the abscissa and ordinate of the virtual guide, USV formation path following requires the virtual guide of the USV formation to move along a parameterized preset path $(x_p(\theta),y_p(\theta))$, $x_p(\theta),y_p(\theta)$ represent points on the preset path, and $\theta$ represents a path parameter;

the cross track error $e_d$ of path following is determined according to $e_d = \sqrt{(x_c(\theta)-x_p(\theta))^2+(y_c(\theta)-y_p(\theta))^2}$; and in the USV formation path following process, the position of the center point $p_c$ of the USV formation changes constantly, a projection $p_p$ of $p_c$ on the preset path also changes, and the virtual guide $p_v$ is selected on the preset path according to $e_d$ so as to maintain the distance from the point $p_p$.

According to another aspect of the present invention, a computer-readable storage medium is provided on which a computer program is stored, the computer program, when executed by a processor, implements the steps of any one of the above methods.

In general, compared with the prior art, the above technical solution conceived by the present invention can achieve the following beneficial effects:

a water space environment information acquisition scheme is constructed first to scientifically characterize complex water space environment information; a new dynamic formation pattern control strategy is proposed in consideration of the problems of USV failures and dispatch and navigation area limitation; cutting-edge technologies in the field of artificial intelligence are introduced to build a deep reinforcement learning model for USV formation path following; by focusing on the key points of deep reinforcement learning model training, the reward function is designed in consideration of a formation pattern composition and a path following error; and a USV formation cooperative detection strategy is adopted to accelerate the deep reinforcement learning model. According to the present invention, the training of a USV path point following model is accelerated through the collaborative exploration strategy, which is combined with a leader-follower formation control strategy to form the USV formation path following algorithm.

DESCRIPTION OF THE EMBODIMENTS

In order to make the object, technical solution and advantages of the present invention clearer, the present invention will be further described in detail with reference to the accompanying drawings and embodiments. It should be understood that the specific embodiments described herein are only used to explain the present invention, and are not used to limit the present invention. In addition, the technical features involved in each embodiment of the present invention described below can be combined with each other as long as they do not conflict with each other.

The purpose of the present invention is to provide a USV formation path-following method based on deep reinforcement learning, which applies a deep reinforcement learning algorithm based on collaborative exploration to USV formation path following, designs a path point following reward function, accelerates the training of a USV path point following model through a collaborative exploration strategy, and combines the collaborative exploration strategy with a leader-follower formation control strategy to form a novel USV formation path following algorithm. The USV formation path-following method based on deep reinforcement learning provided by the present invention is different from a traditional USV formation path-following method in the following three aspects: a multi-underactuated USV formation path following strategy based on deep deterministic strategy gradient (DDPG) is proposed to realize multi-underactuated USV formation path following, and neural network training is used to replace mathematical derivation and calculation; USVs in a formation can dynamically withdraw from the formation to cope with the failures or emergency dispatch of the USVs; and a random braking mechanism is introduced into DDPG training, and the multi-underactuated USV formation achieves excellent performance in formation keeping and path following.

Embodiment 1

Figure 1:
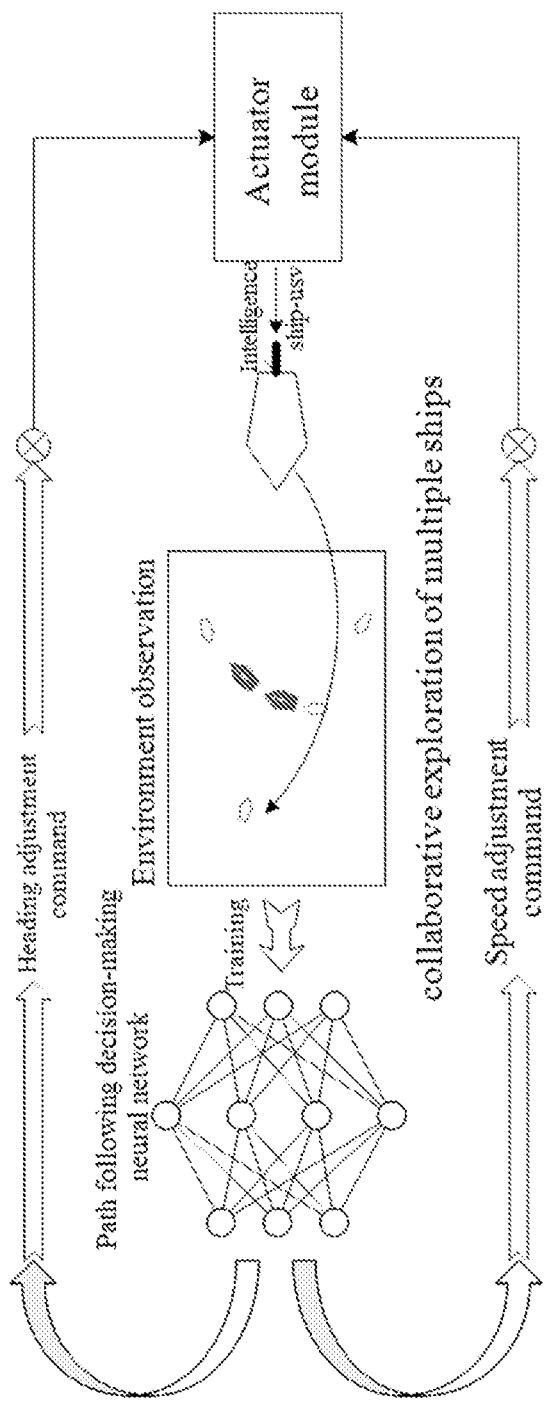
FIG. 1 is a flow diagram of a USV formation path-following method based on deep reinforcement learning provided by an embodiment of the present invention.

FIG. 1 is a flow diagram of a method provided by an embodiment of the present invention, and the method shown in FIG. 1 comprises the following steps:

Step S1: constructing a decision-making neural network model.

In an embodiment of the present invention, the decision-making neural network comprises an input layer, a convolution layer, a hidden layer and an output layer, the convolution layer and the hidden layer are connected by an activation function, and the hidden layer and the output layer are connected by an activation function.

In an embodiment of the present invention, the convolution layer in the decision-making neural network reduces the dimension of input features through a convolution kernel.

In an embodiment of the present invention, activation functions of a fully connected layer in the decision-making neural network are Relu functions.

In an embodiment of the present invention, an exploration function in a decision-making neural network training algorithm decides whether to explore an unknown state according to probability, an initial value of the probability is 0.9 and a minimum value is 0.01, and the probability decreases with a training process.

In an embodiment of the present invention, a state observed by a state observation method in the decision-making neural network training algorithm includes a position deviation and direction deviation between USVs on a water surface and a preset path, and a deviation from a preset speed.

In an embodiment of the present invention, an evaluation result of a training result of the decision-making neural network is determined by the accuracy of a test data set.

Step S2: designing a reward function.

In an embodiment of the present invention, in order to make the USVs form a formation quickly and reach a reference coordinate point quickly while keeping the formation, in the design of the reward function, the speed $R_v$ of the USVs is considered, when sailing toward the reference coordinate point, the speed of the USVs should be maximized, and the lateral deviation speed should be minimized, as expressed by the following formula:

$$R_v = v_i \cos \beta_i - v_i \sin \beta_i \quad (1)$$

where $v_i = [u_i, v_i, r_i]^T$ and $u_i, v_i, r_i$ respectively indicate surging and swaying speeds of the USVs and a yawing angular speed, and an included angle between the USVs is $\beta_i$.

In an embodiment of the present invention, in order to avoid the local optimum of a formation control model, a distance $R_d$ between the USVs and a reference coordinate point is taken as a design factor of the reward function, which is expressed by the following formula:

$$R_d = -\frac{e_f}{e_{f\text{-}max}} \quad (2)$$

where $e_f$ is an error between an actual formation position and an expected formation position, $e_{f\text{-}max}$ indicates a maximum error between an allowed formation position and the expected formation position, and if the error exceeds this value, the current training is invalid and the next training starts.

Therefore, the reward function is:

$$R = k_v R_v + k_d R_d \quad (3)$$

where $k_v$ and $k_d$ are weights of the speed and the distance.

Step S3: exploring an unknown environment and storing data to an experience pool.

In an embodiment of the present invention, detection in an unknown environment is the key to apply a deep reinforcement learning model to a path following task. From the aspect of path following, during navigation, the USV formation needs to avoid static obstacles such as water structures, piers, islands, reefs and shoals, and also needs to cope with dynamic obstacles such as ferries, passing USVs and water floaters. In addition, the influence of water flow disturbance needs to be fully considered.

In an embodiment of the present invention, on the basis of complex environmental information data, the USVs under the path following decision are trained quickly to ensure that the USVs have the ability to resist water flow disturbance, and to adapt to the requirements of various path following tasks such as curves, broken lines and straight lines, so that the USV formation can sail on a predetermined path with a small position deviation and heading deviation under the condition of keeping the formation pattern, thus completing the path following task with high quality.

Figure 2:
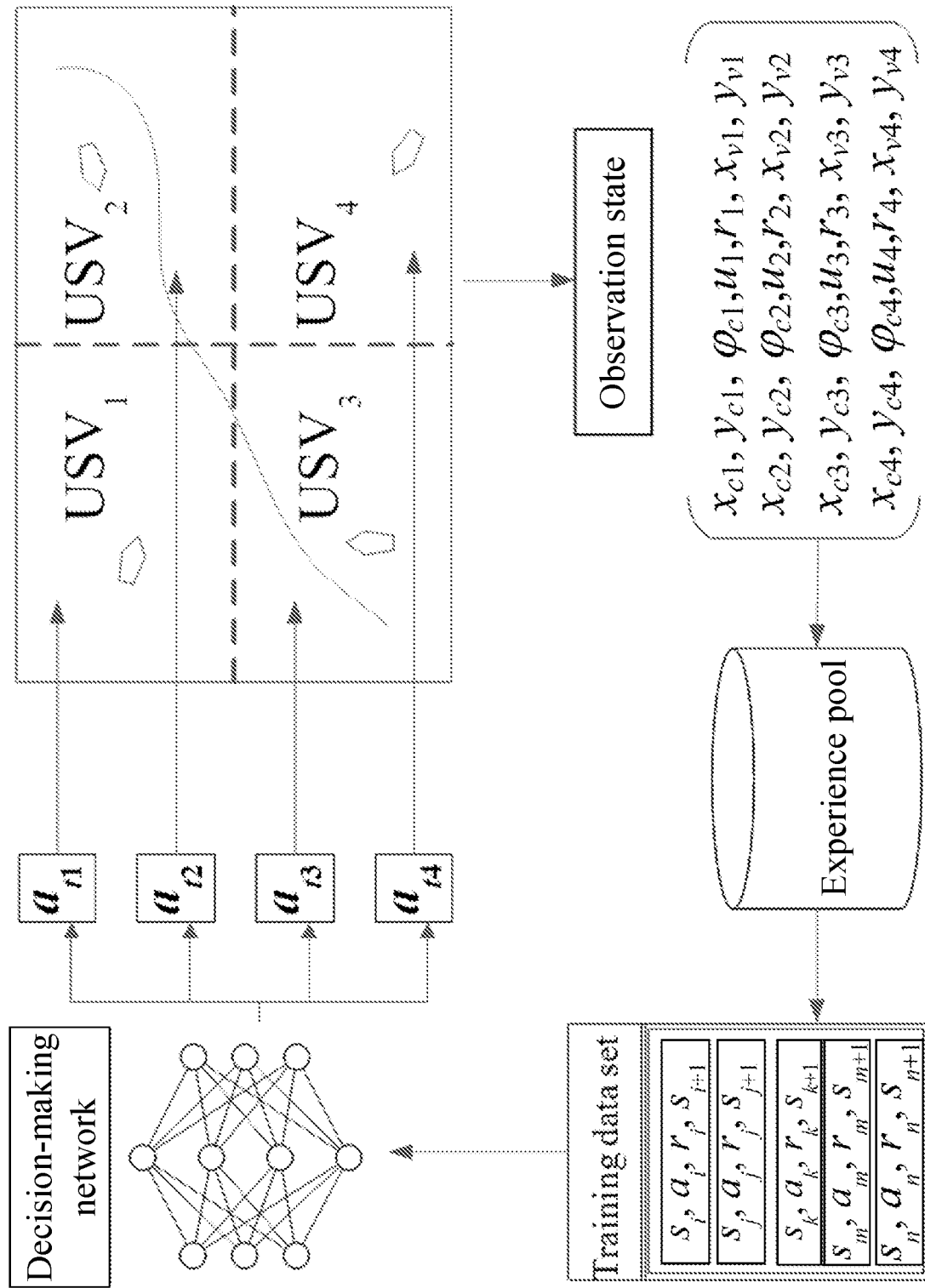
FIG. 2 shows environmental exploration and experience record collection according to an embodiment of the present invention.

As shown in FIG. 2, in an embodiment of the present invention, an action is output through the decision-making neural network, relevant states, actions and rewards are stored in the experience pool, and then the experience records are selected from the experience pool to form a training data set. When the decision-making neural network is trained, the USV formation detects the environment, and each USV in the formation starts detection from different initial states, thus greatly reducing the repetition rate of environmental exploration experience, exploring different motion states faster and accumulating the training data set in the experience pool more quickly.

Figure 3:
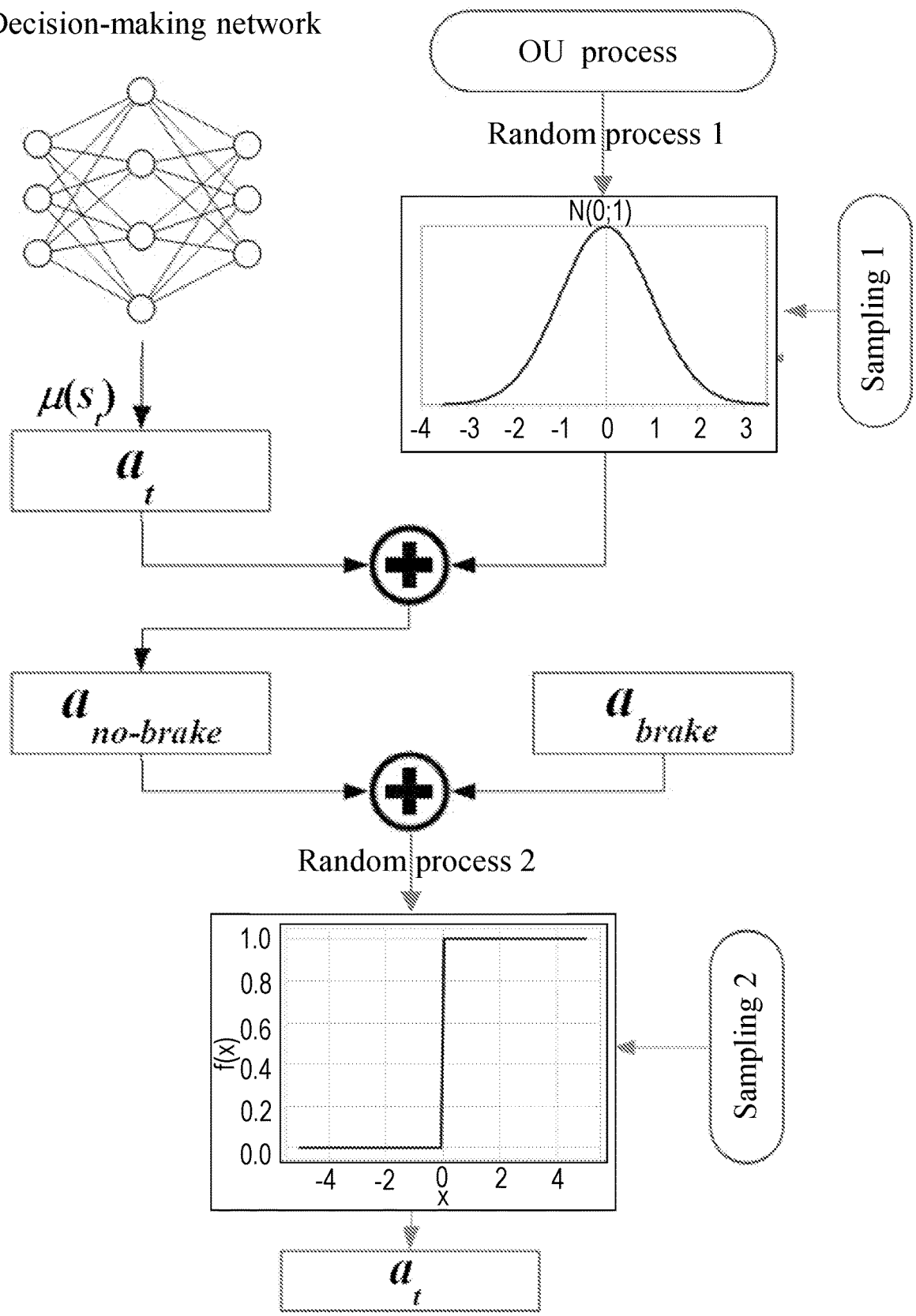
FIG. 3 shows action selection under a random braking mechanism provided by an embodiment of the present invention.

As shown in FIG. 3, in an embodiment of the present invention, a trial-and-error learning mechanism exists in the training of the decision-making neural network based on the DDPG algorithm, and an Ornstein-Uhlenbeck (OU) process is introduced to the DDPG to explore the environment. When the decision-making neural network makes a decision and outputs an action $a_t = \mu(s_t)$, $a_{no\text{-}brake} = \mu(s_t) + N$ is generated by a random process, and an average value of noise N is 0. The OU process is actually a mean regression with random noise. The OU process can be expressed as:

$$da_t = \theta^*(\delta - a)dt + \sigma dW \quad (4)$$

where $\delta$ is the average value of the action after noise is added, W is random noise generated by Brownian motion, $\delta$ is the weight of W, $a_t$ indicates the action output by the neural network, $\theta$ and $\sigma$ respectively indicate the weights of the action and the random noise W, $\mu(s_t)$ indicates a neural network decision strategy, $s_t$ indicates a state input into the neural network at time t, and $a_{no\text{-}brake}$ indicates an action generated by adding the random noise to the action output by the neural network.

Step S4: training the decision-making neural network to obtain USV formation pattern keeping capacity.

Figure 4:
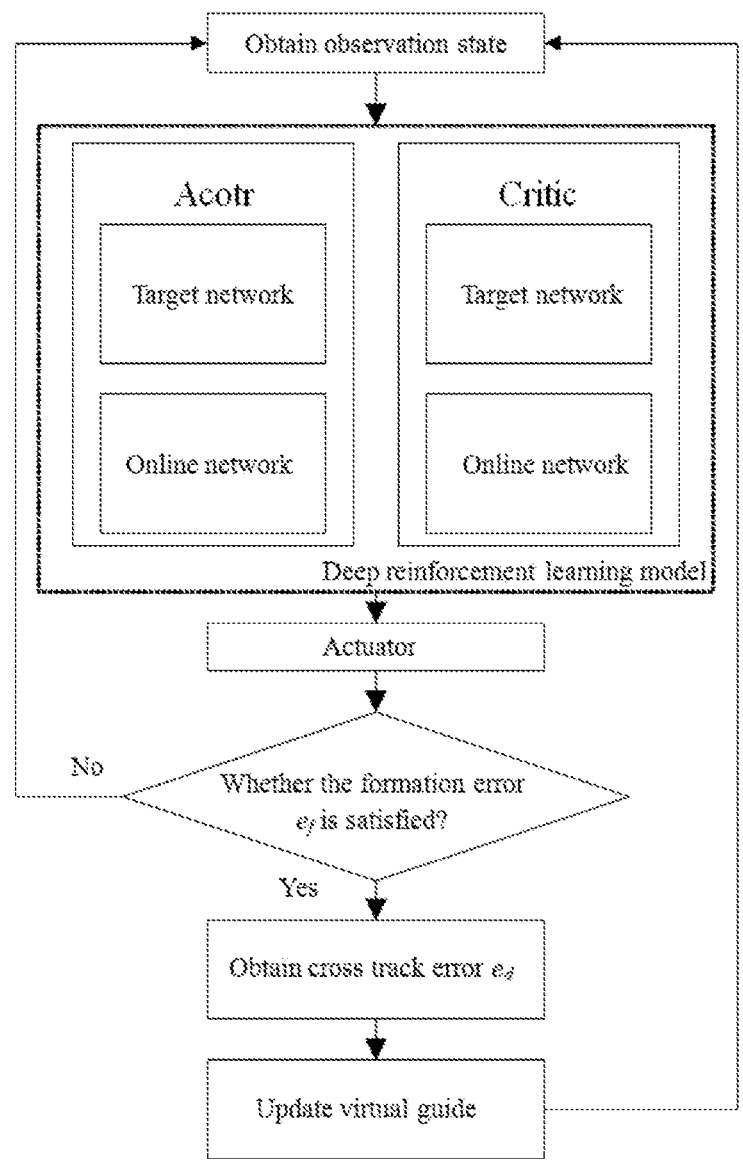
FIG. 4 is a formation pattern keeping control flow provided by an embodiment of the present invention.

As shown in FIG. 4, in an embodiment of the present invention, the decision-making neural network model aims to learn shared decisions, so that an actor network is designed as an approximate strategy, and a gradient descent method is adopted to update parameters in the actor network, with the gradient as follows:

$$\nabla_{\overline{\omega}_\mu} J(\mu) = E_{s \sim \rho} [\nabla_a Q(s, a | \overline{\omega}_a) \cdot \nabla_{\overline{\omega}_\mu} \mu(s | \overline{\omega}_\mu) |_{a = \mu(s)}] \quad (5)$$

where $\rho$ is probability distribution, E represents an expected value of $\nabla_a Q \cdot \nabla_{\overline{\omega}} \mu$, $\nabla_{\overline{\omega}_\mu} J(\mu)$ represents a strategy gradient, $\nabla_a Q(s, a | \overline{\omega}_a)$ represents a partial derivative of an action value function to the action, $\nabla_{\overline{\omega}_\mu} \mu(s | \overline{\omega}_\mu) |_{a = \mu(s)}$ represents a partial derivative of the decision network output to a weight matrix, $\overline{\omega}_\mu$ represents a weight matrix of the decision-making network, $\mu$ represents a neural network decision strategy, and $J(\mu)$ represents a target strategy function.

In an embodiment of the present invention, a small batch of samples are randomly selected as training data, and then the gradient descent process is described as follows:

$$\nabla_{\overline{\omega}_\mu} J(\mu) = \frac{1}{N} \sum_i \left( \nabla_a Q(s, a | \overline{\omega}_a^i) \cdot \nabla_{\overline{\omega}_\mu} \mu(s | \overline{\omega}_\mu^i) |_{s = s_i, a = \mu(s_i)} \right) \quad (6)$$

where N is the size of the small batch of samples, $\overline{\omega}_a$ is a parameter in a target evaluation network, $Q(s, a | \overline{\omega}_a^i)$ represents an action value function, $\overline{\omega}_a^i$ represents an evaluation network weight of the ith iteration, $\overline{\omega}_\mu^i$ represents a decision network weight of the ith iteration, $s_i$ represents state input of the neural network of the ith iteration, and $\mu(s_i)$ represents a neural network decision strategy.

In an embodiment of the present invention, it is assumed that C(s,a) can be connected to a state vector s and an action vector a, and Q is called a target evaluation network, as shown in the following formula (7):

$$Q(s,a) = \overline{\omega}_a^T C(s,a) \quad (7)$$

where C(s,a) represents a combination of s and a.

In an embodiment of the present invention, the formula (7) can be updated by optimizing a loss function, and an updated formula (8) is as follows:

$$L(\overline{\omega}) = E[(r(s,a) + \gamma Q(s',a';\overline{\omega}_a) - Q(s,a;\overline{\omega}_\beta))^2] \quad (8)$$

where $\overline{\omega}_\beta$ is a parameter in an online evaluation network, s indicates a next state after taking an action a at a state s, a' is an action taken by the decision-making neural network at s', r is a reward value, $L(\overline{\omega})$ represents a loss value between an output value of the trained network and an expected value, $\overline{\omega}$ represents a set of $\overline{\omega}_a$ and $\overline{\omega}_\beta$, r(s,a) represents a reward value, $\gamma$ represents a discount factor, $Q(s',a';\overline{\omega}_a)$ represents a target evaluation value of the target evaluation network, and $Q(s,a;\overline{\omega}_\beta)$ represents a target evaluation value of the online evaluation network.

In an embodiment of the present invention, the parameter $\overline{\omega}_\beta$ in the online evaluation network is updated by a random gradient descent method, wherein the gradient is as follows:

$$\nabla_{\overline{\omega}} L(\overline{\omega}) = E[(r(s,a) + \gamma Q(s',a';\overline{\omega}_a) - Q(s',a;\overline{\omega}_\beta))\nabla_m Q(s,a;\overline{\omega}_\beta)] \quad (9)$$

where $\nabla_{\overline{\omega}}$ represents the gradient.

In an embodiment of the present invention, random braking is introduced after the decision-making neural network completes the action selection. By introducing the random braking mechanism, an unmanned surface vessel (USV) can accelerate quickly when being far from the reference coordinate point, and can brake correctly when being close to the reference coordinate point.

In an embodiment of the present invention, the USVs may be best rewarded by maintaining the maximum speed, and the deceleration movement may be eliminated when the USVs are trained to select an action through the decision-making neural network. After reaching the reference coordinate point, the USVs may keep the maximum speed and rotate around the reference coordinate point. To avoid the occurrence of this situation, the random braking mechanism is introduced to randomly select the action output by the decision-making neural network and the USV deceleration action according to probability as the final action of the USVs.

Step S5: path following scheme: controlling the USV formation to move while keeping a preset pattern according to the path following scheme, so as to realize USV formation path following.

In an embodiment of the present invention, in order to solve the USV formation path following problem, the leader-follower formation control strategy is introduced, the reference position of each USV in the formation is established according to the position of a virtual guide, and the position of the virtual guide represents the position of the whole USV formation.

Figure 5:
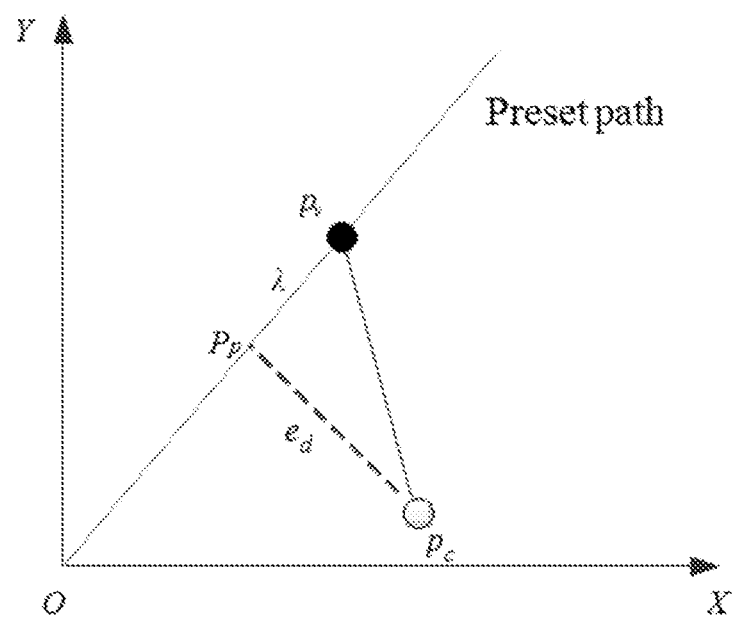
FIG. 5 is a formation path following strategy provided by an embodiment of the present invention.

As shown in FIG. 5, in an embodiment of the present invention, a center point of the USV formation is $p_c(x_c,y_c)$, where $x_c,y_c$ respectively represent the abscissa and ordinate of the center point of the USV formation, $e_d$ represents a cross track error between $p_c$ and a point $p_p(x_p,y_p)$ on the preset path, $x_p,y_p$ represent the abscissa and ordinate of $p_p(x_p,y_p)$, $p_v(x_v,y_v)$ represents an expected position of the virtual guide, and $x_v,y_v$ represent the abscissa and ordinate of the virtual guide. USV formation path following requires the virtual guide of the USV formation to move along a parameterized preset path $(x_p(\theta),y_p(\theta))$ $x_p(\theta),y_p(\theta)$ represents a point on the preset path, and $\theta$ represents a path parameter. The path can be expressed as a function containing $\theta$, and the cross track error $e_d$ of path following can be expressed as:

$$e_d = \sqrt{(x_c(\theta)-x_p(\theta))^2 + (y_c(\theta)-y_p(\theta))^2} \quad (10)$$

In an embodiment of the present invention, in the USV formation path following process, the position of the center point $p_c$ of the USV formation will change constantly, a projection $p_p$ of $p_c$ on the preset path will also change, and the virtual guide $p_v$ is selected on the preset path so as to maintain the distance from the point $p_p$.

In an embodiment of the present invention, the update of the virtual guide is related to the position of the center point of the formation. As shown in FIG. 5, $\lambda$ is a fixed value. When the position of the center point $p_c$ of the USV formation changes constantly, the virtual guide can be constantly updated as the USV formation moves to ensure the USV formation keeping and path following effects.

Embodiment 2

In an example implemented by the present invention, a USV motion model is a 3-degree-of-freedom underactuated USV motion model, and USV operation is discretized into six fixed actions: "forward acceleration", "forward deceleration", "leftward acceleration", "leftward deceleration", "rightward acceleration" and "rightward deceleration".

When constructing the decision-making neural network model, the decision-making neural network comprises an input layer, a convolution layer, a hidden layer and an output layer, the convolution layer and the hidden layer are connected by an activation function, and the hidden layer and the output layer are connected by an activation function. Because the USVs may be best rewarded when keeping the maximum speed, the USVs cannot learn deceleration, and will advance to the reference coordinate point at the maximum speed and rotate around the reference coordinate point at the maximum speed when reaching the reference coordinate point. Therefore, the deceleration motion of the USVs needs to be considered when designing the reward function.

The training of a USV formation path following model is a process of interaction with the environment. The USV formation detects the surrounding environment, makes decisions according to an observation state of the surrounding environment, evaluates the selection of USV formation path following actions in combination with a task objective and the observation state, then trains the USVs to form a following path according to an evaluation value and the training model, and finally, executes selected operation and changes the environment to regain the observation state. This process is repeated till the USV formation path following model can select an expected action.

When the decision-making neural network is trained, multiple underactuated USVs explore the environment at the same time, and each USV starts exploration from different initial states, thus greatly reducing the repetition rate of exploration experience and exploring different motion states faster. The multiple underactuated USVs are suitable for the same decision-making neural network, and there is no need to train each USV separately, thus ensuring the behavior consistency of the USVs in the formation. Finally, the decision-making neural network outputs the action and stores relevant states, actions and rewards in the experience pool, and then selects the experience records from the experience pool to form the training data set.

Braking operation can enlarge action space, and also can reduce the speed and reward value of the USVs, so that the formation control model may ignore the braking operation, and the formation control model may generate some bad experience records to cause the situation of local optimum of final constant braking. To avoid such situation, the random braking mechanism is added in the training process of the USV formation, and a probability is set to randomly select the braking action. The training model with random braking can only brake under a certain probability, and can avoid local optimum of constant braking and finally learn to brake. After adopting the random braking mechanism, the USVs can accelerate quickly when being far from the reference coordinate point, and can brake properly when being near the reference coordinate point.

A USV formation path following task can be divided into a USV formation pattern keeping task and a USV path following task. From the perspective of the USV formation pattern keeping task, the state of the USV and the relationship between the virtual guide and other USVs are the main factors affecting the speed and standard of the USV formation. The state of the USV is characterized by its position, heading and speed. The expected position of each USV and the position of the virtual guide are all necessary information. From the perspective of the USV path following task, the update of the virtual guide is related to the cross track error $e_d$ of path following.

By introducing the leader-follower formation control strategy, the virtual guide is updated constantly as the USV formation moves, thus ensuring that the USV formation keeps the preset pattern to realize formation path following.

The present application also provides a computer-readable storage medium such as a flash memory, a hard disk, a multimedia card, a card type memory (for example, SD or DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, a server, an App store, etc., on which a computer program is stored, and when the programs is executed by a processor, the USV formation path-following method based on deep reinforcement learning in the method embodiments is implemented.

It should be pointed out that according to the needs of implementation, each step/component described in the present application can be divided into more steps/components, and two or more steps/components or part of the operations in steps/components can be combined into new steps/components to achieve the purpose of the present invention.

Those skilled in the art can easily understand that the above are only preferred embodiments of the present invention, and are not used to limit the present invention. Any modification, equivalent substitution and improvement made within the spirit and principle of the present invention should be included in the protection scope of the present invention.

What is claimed is:

1. An unmanned surface vessel (USV) formation path-following method based on deep reinforcement learning, comprising the following steps:
   step S1, constructing a decision-making neural network model;
   step S2, according to simultaneous exploration of multiple underactuated USVs, extracting environmental information of water space and storing data to an experience pool;
   wherein the step S2 comprises:
   outputting actions through the decision-making neural network model, storing relevant states, actions and rewards in the experience pool, and then selecting the experience records from the experience pool to form a training data set, and when the training data set is used to train the decision-making neural network model, starting detection by each USV from different initial states, and storing detected motion states in the experience pool;
   step S3, selecting training data from the data stored in the experience pool to train the decision-making neural network model, and optimizing a training process of deep reinforcement learning by adopting a random braking mechanism, so as to obtain USV formation pattern keeping capacity;
   step S4, controlling the USVs to move along a preset path by the decision-making neural network model based on collaborative exploration, and continuously updating positions of the USVs, to realize path following of all the USVs in a formation;
   wherein the step S4 comprises:
   assuming that a center point of the USV formation is $p_c(x_c,y_c)$, where $x_c,y_c$ respectively represent an abscissa and an ordinate of the center point of the USV formation, $e^d$ represents a cross track error between $p_c$ and a point $p_p(x_p,y_p)$ on the preset path, $x_p,y_p$ represent the abscissa and the ordinate of $p_p(x_p,y_p)$, $p_v(x_v,y_v)$ represents an expected position of a virtual guide, $x_v,y_v$ represent the abscissa and the ordinate of the virtual guide, USV formation path following requires the virtual guide of the USV formation to move along a parameterized preset path $(x_p(\theta),y_p(\theta))$, $x_p(\theta),y_p(\theta)$ represent points on the preset path, and $\theta$ represents a path parameter;
   determining the cross track error $e_d$ of path following by $$e_d = \sqrt{(x_c(\theta) - x_p(\theta))^2 + (y_c(\theta) - y_p(\theta))^2};$$

and
   in a USV formation path following process, changing the position of the center point $p_c$ of the USV formation constantly, changing a projection $p_p$ of $p_c$ on the preset path as well, and selecting the virtual guide $p_v$ on the preset path according to $e_d$ so as to maintain the distance from the point $p_p$; and
   step S5, controlling the movement of the USV pattern according to path following, so as to keep the USV following pattern and realize formation path following.

2. The method according to claim 1, wherein in a reward function, a speed of the USVs is considered, when sailing toward a reference coordinate point, the speed of USV should be maximized, and a lateral deviation speed should be minimized, and a distance between the USVs and a reference coordinate point is regarded as a design factor of the reward function.

3. The method according to claim 2, wherein the reward function is designed according to $R=k_v R_v + k_d R_d$, where $R_v$ represents the speed of the USVs, $R_d$ represents the distance between the USVs and reference coordinate point, and $k_v$ and $k_d$ are weights of the speed and the distance.

4. The method according to claim 1, wherein the step S3 comprises:
   training the decision-making neural network model based on a deep deterministic policy gradient (DDPG) algorithm, and introducing an Ornstein-Uhlenbeck (OU) process into DDPG in the training process to explore the environment, wherein when the decision-making neural network model makes a decision and outputs an action $a_t=\mu(s_t)$, an action produced by a random process is $a_{no\text{-}brake}=\mu(s_t)+N$, an average value of noise N is 0, $a_t$ indicates the action output by a neural network, $\mu(s_t)$ indicates a neural network decision strategy, $s_t$ indicates a state input into the neural network at time T, and $a_{no\text{-}brake}$ indicates an action generated by adding random noise to the action output by the neural network.

5. The method according to claim 4, wherein the decision-making neural network model keeps the USV formation pattern by learning shared decisions, an actor network is designed as an approximate strategy, and parameters in the actor network are updated by a gradient descent method.

6. The method according to claim 5, wherein a target evaluation network in the decision-making neural network model is determined according to $Q(s,a)=\overline{\omega}_a^T C(s,a)$, the target evaluation network is updated by optimizing a loss function as $$L(\overline{\omega}) = E\left[(r(s, a) + \gamma Q(s', a'; \overline{\omega}_a) - Q(s, a; \overline{\omega}_\beta))^2\right],$$

and a parameter $\overline{\omega}_\beta$ is updated by a random gradient descent method, where $\overline{\omega}_\beta$ is a parameter in an online evaluation network, $\overline{\omega}_a$ is a parameter in the target evaluation network, s' indicates a next state after taking an action a at a state s, a' is an action taken by the decision-making neural network at s', r is a reward value, $L(\overline{\omega})$ represents a loss value between an output value of the trained network and an expected value, $\overline{\omega}$ represents a set of $\overline{\omega}_a$ and $\overline{\omega}_\beta$, r(s,a) represents a reward value, $\gamma$ represents a discount factor, $Q(s',a';\overline{\omega}_a)$ represents a target evaluation value of the target evaluation network, $Q(s,a;\overline{\omega}_\beta)$ represents a target evaluation value of the online evaluation network, c(s,a) represents a combination of s and a, s represents a state vector, and a represents an action vector.

* * * * *